April 16, 1963 IKURO MORIYA 3,085,728

SEVERING DEVICE FOR RECORDED MAGNETIC RECORDING SHEETS IN A MAGNETIC RECORDER/REPRODUCER

Filed June 13, 1961 2 Sheets-Sheet 1

April 16, 1963 IKURO MORIYA 3,085,728

SEVERING DEVICE FOR RECORDED MAGNETIC RECORDING SHEETS IN A MAGNETIC RECORDER/REPRODUCER

Filed June 13, 1961 2 Sheets-Sheet 2

United States Patent Office 3,085,728
Patented Apr. 16, 1963

3,085,728
SEVERING DEVICE FOR RECORDED MAGNETIC RECORDING SHEETS IN A MAGNETIC RECORDER/REPRODUCER

Ikuro Moriya, Yokohama, Japan, assignor to Victor Company of Japan, Limited, Yokohama, Japan Filed June 13, 1961, Ser. No. 116,779
Claims priority, application Japan Aug. 13, 1960
1 Claim. (Cl. 225—89)

This invention relates to a device for severing recorded sheets in a magnetic recorder/reproducer.

An object of the present invention is to provide a severing device for magnetic recording sheets whereby, in severing a magnetic sheet, it can be severed without severing the recorded portion of the sheet.

An embodiment of the present invention shall be explained in the following with reference to the drawings.

Figure 1:
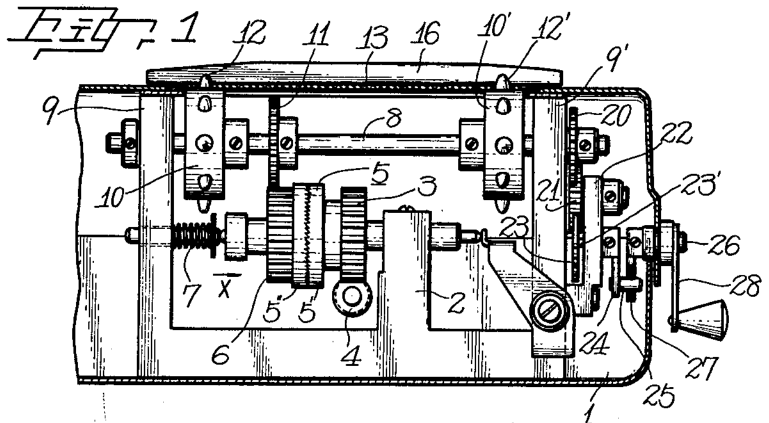
FIGURE 1 is an elevation of a part of a magnetic recorder/reproducer provided with the device of the present invention.
Figure 5:
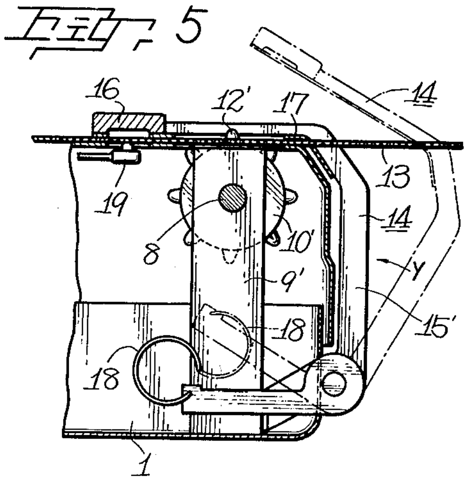

In the drawings, 1 is a case. A worm wheel 3 is borne on a bearing 2 provided within said case so as to mesh with a worm 4 rotated by a sheet driving motor (not illustrated). 5 is a gear clutch. 6 is an interlocking gear. The gear clutch 5 consists of two coupling disks 5′ and 5″ having saw-shaped teeth made on the peripheries of their opposed surfaces. The coupling disks 5′ and 5″ are fixed to the worm wheel 3 and to the interlocking gear 6, respectively. 7 is a spring to press the coupling disk 5″ by its resiliency in the direction indicated by the arrow X in FIGURE 1 through the interlocking gear 6 so that the saw-shaped teeth of each of both coupling disks 5′ and 5″ may mesh with those of the other. 8 is a rotary shaft borne at both ends by bearings 9 and 9′ and has sprocket wheels 10 and 10′ and a fourth interlocking gear 11 which are fixed to the shaft 8. Said interlocking gear 11 meshes with the interlocking gear 6. Driving sprocket teeth 12 and 12′ made on the peripheral surfaces of both sprocket wheels 10 and 10′, respectively, are to fit in perforations made on both sides of a magnetic record-reproducing sheet 13. 14 is a severing frame which is also a holding plate. Said severing frame consists of two U-shaped arms 15 and 15′ pivoted in the lower end parts to the lower part of the side wall of the case 1, a holding plate 16 fixed at each end to one end part of the upper surface of each of said arms and a severing blade 17 fixed at each end to the other end part of the upper surface of each arm. As evident in FIGURE 5, when said severing frame 14 is rotated to the position shown by the solid lines in the direction indicated by the arrow Y from the position shown by the chain lines, a spring 18 will go beyond the dead center and will press the holding plate 16 and severing blade 17 against the upper surface of the sheet 13 by its resiliency so that the sheet 13 may be pressed into contact with the top surface of a magnetic record-reproducing head 19. 20 is a first interlocking gear fixed to the right end of the rotary shaft 8 for the sprocket wheels 10 and 10′. 21 is a second interlocking gear borne by the bearing 9′ and another bearing 22 and meshing with the above mentioned interlocking gear 20. 23 is a third interlocking gear having teeth made on about half the periphery of it. Said gear 23 is borne by a shaft 23′ on the bearing 22. A rotary lever 24 is fixed in the direction at right angle to said shaft 23′ at the right end of it. A matching pin 25 is attached to the free end of said rotary lever. 26 is a rotary shaft borne in the side wall of the case 1. A driving arm lever 27 at right angle to said rotary shaft and a driving handle 28 are attached to the left end and right end of the rotary shaft 26, respectively. The matching pin 25 of said rotary lever 24 is to be fitted in a matching hole 29 made at the free end of said driving arm lever 27.

Figures 2, 3:
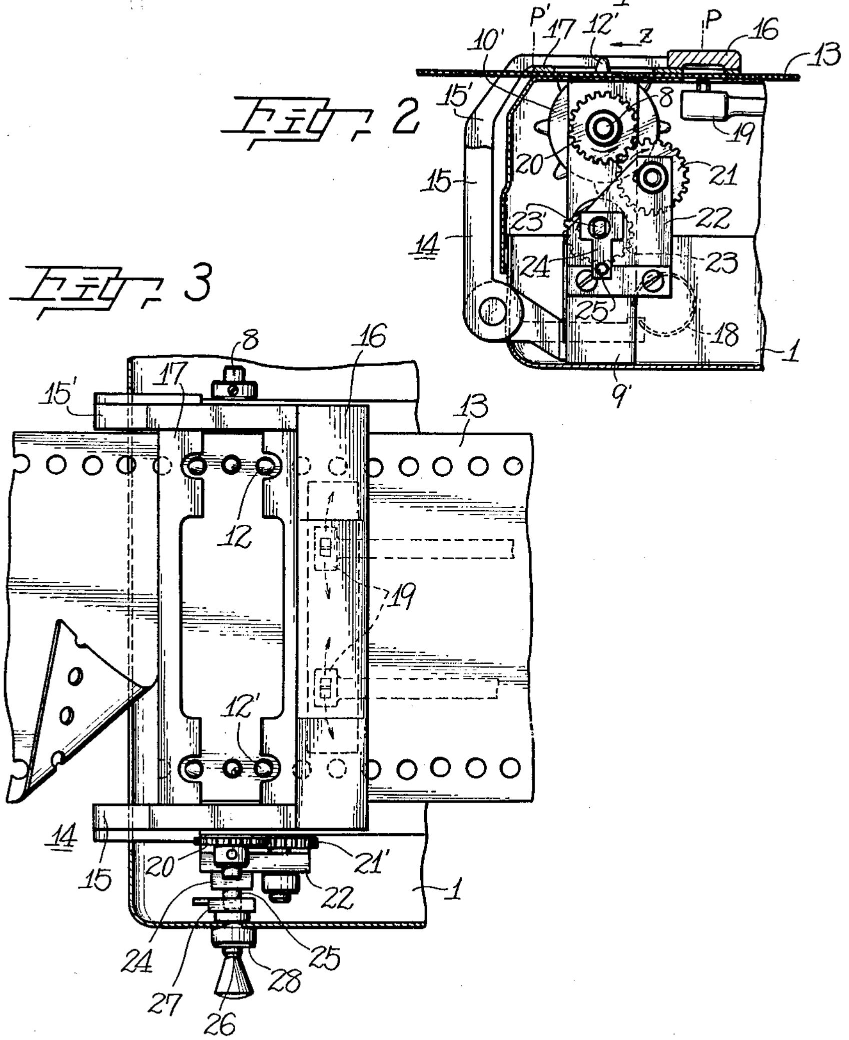
FIGURE 2 is a side view thereof.
FIGURE 3 is a plan view thereof.
Figure 4:
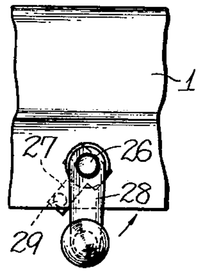
FIGURES 4 and 5 are side views of a separate part thereof.
Figure 6:
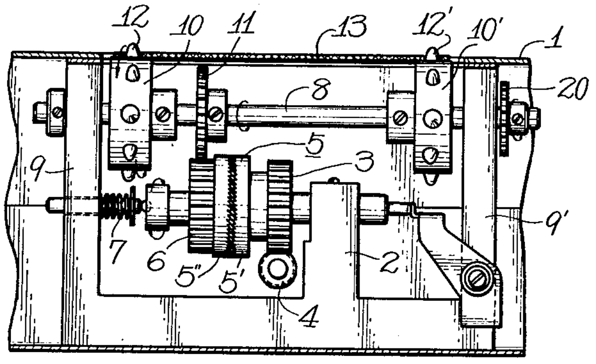
FIGURE 6 is an explanatory view for the operation of the present invention.

Now, the operation of the magnetic recorder/reproducer provided with the device of the present invention shown in the drawings shall be explained. In this magnetic recorder/reproducer, when the worm 4 is rotated by a sheet driving motor (not illustrated), both sprocket wheels 10 and 10′ will be rotated through the worm wheel 3 meshing with it, gear clutch 5, interlocking gears 6 and 11 and rotary shaft 8. By this rotation, the magnetic record-reproducing sheet 13 will be moved in the direction indicated by the arrow Z in FIGURE 2. At this time, the magnetic record-reproducing head 19 will reciprocate in the direction of the width of the sheet 13 so that a magnetic record may be applied laterally to the sheet. After a desired length of the magnetic record is made on the sheet 13, when the sheet is to be severed, the sheet driving motor is once turned off to stop the movement of the sheet 13 and then the driving handle 28 is rotated counterclockwise. Then, the interlocking gear 23 will rotate counterclockwise through the rotary shaft 26, driving arm lever 27, rotary lever 24 matched with said driving arm lever by the hole 29 and pin 25 and shaft 23′. Therefore, only while the teeth made on about half the periphery of said interlocking gear 23 are in mesh with the gears of the interlocking gear 21, the shaft 8, interlocking gear 11 and both sprocket wheels 10 and 10′ will be rotated counterclockwise through said interlocking gear 21 and the interlocking gear 20 meshing with it. (Further, at this time, as shown in FIGURE 6, the interlocking gear 6 meshing with the interlocking gear 11 and one connecting disk 5″ of the gear clutch 5 fixed to said gear 6 will move leftward against the resiliency of the spring 7 from the other connecting disk 5′, the sprocket teeth of each of both connecting disks 5′ and 5″ will be disengaged from those of the other and the interlocking gear 6 will also freely rotate. Therefore, this interlocking gear 6 will not prevent the interlocking gear 11 and sprocket wheels 10 and 10′ from rotating counterclockwise.) Therefore, by this operation, as shown in FIGURE 2, both sprocket wheels 10 and 10′ will move the sheet 13 leftward from the point P to the point P′. At this time, a magnetic record will be applied to the lower surface of the sheet 13 from the left end of the sheet to the point P and no record will be applied to the surface to the right of the point P. Therefore, when the point P has moved to the point P′, if the sheet 13 is severed along the severing blade 17 as shown in FIGURE 3, the sheet will be able to be severed without severing the recorded part of the sheet.

According to the present invention, the magnetically recorded part of the sheet can be severed by such simple structure and operation as are explained above without such unfavorableness as severing the surface to which the record has been applied. In this point, the present invention is practically effective.

What I claim is:

A severing device for recorded magnetic recording sheets in a magnetic recorder/reproducer comprising at least one sprocket wheel having a rotary shaft for moving a magnetic recording sheet, a first interlocking gear fixed to said rotary shaft, a second interlocking gear meshing with said first interlocking gear, a third interlocking gear meshing with said second interlocking gear and having meshing teeth on only about one half the periphery, a clutch provided between a fourth interlocking gear and a worm wheel wherein the former is fixed on said rotary shaft and meshes indirectly with a worm and worm wheel driven by an electric motor, and a holding plate and severing blade pressed against the upper surface of said magnetic recording sheet at a proper spacing in the longitudinal direction of the sheet.

References Cited in the file of this patent

UNITED STATES PATENTS

| | | |
|---|---|---|
| 1,297,637 | Benon | Mar. 18, 1919 |
| 2,145,506 | De Mattia | Jan. 31, 1939 |
| 2,252,735 | Sherman | Aug. 19, 1941 |
| 2,477,128 | Hope | July 26, 1949 |